United States Patent
Shin (10) Patent No.: US 12,139,083 B2
(45) Date of Patent: Nov. 12, 2024

(54) VEHICLE POWER MANAGEMENT APPARATUS AND METHOD THEREOF

(71) Applicants: Hyundai Motor Company, Seoul (KR); Kia Corporation, Seoul (KR)

(72) Inventor: Jong Gyun Shin, Hwaseong-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 296 days.

(21) Appl. No.: 17/702,398

(22) Filed: Mar. 23, 2022

(65) Prior Publication Data

US 2023/0086719 A1 Mar. 23, 2023

(30) Foreign Application Priority Data

Sep. 17, 2021 (KR) .................. 10-2021-0125189

(51) Int. Cl.
*B60R 16/033* (2006.01)
*B60L 58/13* (2019.01)
*B60W 10/26* (2006.01)

(52) U.S. Cl.
CPC ........... *B60R 16/033* (2013.01); *B60L 58/13* (2019.02); *B60W 10/26* (2013.01); *B60W 2710/244* (2013.01)

(58) Field of Classification Search
CPC . B60H 1/00771; B60H 1/00778; B60L 1/006; B60L 58/13; B60R 16/033; B60W 30/18054
See application file for complete search history.

(56) References Cited

U.S. PATENT DOCUMENTS

| 10,933,750 B2 * | 3/2021 | Jun ........................ B60T 7/042 |
| 11,560,034 B1 * | 1/2023 | Rocroi .................. B60W 10/22 |
| 2013/0325273 A1 * | 12/2013 | Reuter .................. B60W 50/10 701/54 |
| 2017/0174157 A1 * | 6/2017 | Deljevic ................. B60L 58/12 |
| 2018/0154793 A1 * | 6/2018 | Jun .................... B60H 1/00778 |

(Continued)

FOREIGN PATENT DOCUMENTS

| CN | 113232656 A * | 8/2021 | ........... B60G 17/016 |
| JP | 2006141156 A * | 6/2006 | |

(Continued)

OTHER PUBLICATIONS

EPO machine translation of KR 20180065209-A (original KR document published Jun. 18, 2018) (Year: 2018).*

(Continued)

*Primary Examiner* — David A Testardi
(74) *Attorney, Agent, or Firm* — SLATER MATSIL, LLP (57) ABSTRACT

An embodiment vehicle power management apparatus includes a memory configured to store a threshold state of charge (SOC) and a processing device functionally connected with the memory, wherein the processing device is configured to set a power management mode to a camping mode, identify a battery SOC, identify whether the battery SOC is greater than or equal to the threshold SOC, and enter the camping mode to allow an operation of a first vehicle function and limit an operation of a second vehicle function in response to the battery SOC being greater than or equal to the threshold SOC.

18 Claims, 5 Drawing Sheets

(56) References Cited

U.S. PATENT DOCUMENTS

| | | | | |
|---|---|---|---|---|
| 2018/0326993 A1* | 11/2018 | Lovett | ................... | H04L 67/125 |
| 2021/0053460 A1* | 2/2021 | Oh | .......................... | B60L 58/14 |
| 2021/0156705 A1* | 5/2021 | Pietryka | ................ | B60K 35/00 |
| 2022/0266706 A1* | 8/2022 | Fukai | .................... | B60L 3/0046 |
| 2022/0266716 A1* | 8/2022 | Kim | ........................ | B60L 50/61 |
| 2022/0396257 A1* | 12/2022 | Edman | ................... | H04W 4/44 |
| 2023/0037655 A1* | 2/2023 | Hurr | ....................... | B60R 25/24 |
| 2023/0077574 A1* | 3/2023 | Goesselsberger | ....... | B60L 50/62 |
| | | | | 701/48 |

FOREIGN PATENT DOCUMENTS

| | | | | |
|---|---|---|---|---|
| JP | 2012016197 A | * | 1/2012 | |
| JP | 2014064457 A | * | 4/2014 | |
| JP | 2019208339 A | * | 12/2019 | |
| JP | 2020082801 A | * | 6/2020 | |
| KR | 20170079016 A | * | 7/2017 | |
| KR | 20180065209 A | * | 6/2018 | |
| KR | 102124003 B1 | * | 6/2020 | |
| KR | 20200102145 A | * | 8/2020 | |
| KR | 102154981 B1 | | 9/2020 | |
| KR | 20210023072 A | * | 3/2021 | |

OTHER PUBLICATIONS

EPO machine translation of JP 2020-082801 A (original JP document published Jun. 4, 2020) (Year: 2020).*

Gill, D, "Tips for Going Camping in Your Tesla", Tips for Tesla Owners, May 29, 2021, TALSEM, 8 pages, downloaded from: https://talsem.com/blogs/tesla-tips/tips-for-going-camping-in-your-tesla (Year: 2021).*

* cited by examiner

VEHICLE POWER MANAGEMENT APPARATUS AND METHOD THEREOF

CROSS-REFERENCE TO RELATED APPLICATIONS

This application claims the benefit of Korean Patent Application No. 10-2021-0125189, filed on Sep. 17, 2021, which application is hereby incorporated herein by reference.

TECHNICAL FIELD

The present disclosure relates to a vehicle power management apparatus and a method thereof.

BACKGROUND

As more and more people enjoy camping, car camping, which includes staying in a vehicle without equipment such as a separate tent, is gaining popularity. Such car camping is advantageous in terms of mobility and convenience, because people may sleep in a vehicle without specialized equipment such as a tent and thus camp with only simple equipment. However, as the time spent in the vehicle increases upon car camping, a user often has a hard time because the vehicle's battery is inadvertently discharged.

SUMMARY

Embodiments of the present disclosure can solve problems occurring in the prior art while advantages achieved by the prior art are maintained intact.

An embodiment of the present disclosure provides a vehicle power management apparatus for limiting an operation of an unnecessary vehicle function upon car camping to minimize power consumption of a vehicle.

The technical problems solvable by embodiments of the present disclosure are not limited to the aforementioned problems, and any other technical problems not mentioned herein will be clearly understood from the following description by those skilled in the art to which the present disclosure pertains.

According to an embodiment of the present disclosure, a vehicle power management apparatus may include a memory storing a threshold state of charge (SOC) and a processing device connected with the memory. The processing device may set a power management mode to a camping mode, may identify a battery SOC, may identify whether the battery SOC is greater than or equal to the threshold SOC, and may enter the camping mode to allow an operation of a first vehicle function and limit an operation of a second vehicle function, when the battery SOC is greater than or equal to the threshold SOC.

The processing device may set the power management mode to the camping mode, when a vehicle enters a camping place to be parked based on map data.

The processing device may set the power management mode to the camping mode depending on a user input received from a user interface in a user setting menu.

The first vehicle function may include a room lamp on and off function or a door unlock function.

The processing device may monitor the battery SOC after entering the camping mode and may output a warning, when the battery SOC decreases to a predetermined reference SOC or less.

The processing device may switch the power management mode to a power-saving mode, when the battery SOC is less than the threshold SOC.

The processing device may enter the power-saving mode to shut off all power to a vehicle.

The processing device may release the power-saving mode, when receiving a reset command from a reset input device.

The processing device may release the camping mode, when an ignition is turned on in the state where the processing device enters the camping mode.

The second vehicle function may include at least one of lighting of a warning light of a cluster, a seat function, an automatic opening and closing function of a power tailgate, an automatic opening and closing function of a power sliding door, an automatic on and off function of a room lamp as a vehicle door is opened and closed, or an automatic on and off function of a tailgate luggage lamp as a tailgate is opened and closed.

According to another embodiment of the present disclosure, a vehicle power management method may include setting, by a processing device, a power management mode to a camping mode, identifying, by the processing device, a battery SOC, identifying, by the processing device, whether the battery SOC is greater than or equal to a predetermined threshold SOC, and entering, by the processing device, the camping mode to allow an operation of a first vehicle function and limit an operation of a second vehicle function, when the battery SOC is greater than or equal to the threshold SOC.

The setting of the power management mode to the camping mode may include setting the power management mode to the camping mode, when a vehicle enters a camping place to be parked based on map data.

The setting of the power management mode to the camping mode may include setting the power management mode to the camping mode depending on a user input received from a user interface in a user setting menu.

The first vehicle function may include a room lamp on and off function or a door unlock function.

The vehicle power management method may further include monitoring, by the processing device, the battery SOC after entering the camping mode and outputting, by the processing device, a warning, when the battery SOC decreases to a predetermined reference SOC or less.

The vehicle power management method may further include switching, by the processing device, the power management mode to a power-saving mode, when the battery SOC is less than the threshold SOC.

The switching of the power management mode to the power-saving mode may include entering, by the processing unit, the power-saving mode to shut off all power to a vehicle.

The vehicle power management method may further include releasing, by the processing unit, the power-saving mode, when receiving a reset command from a reset input device.

The vehicle power management method may further include releasing, by the processing unit, the camping mode, when an ignition is turned on in the state where the processing device enters the camping mode.

BRIEF DESCRIPTION OF THE DRAWINGS

The above and other objects, features and advantages of embodiments of the present disclosure will be more apparent from the following detailed description taken in conjunction with the accompanying drawings, in which.

DETAILED DESCRIPTION OF ILLUSTRATIVE EMBODIMENTS

Hereinafter, some embodiments of the present disclosure will be described in detail with reference to the exemplary drawings. In the drawings, the same reference numerals will be used throughout to designate the same or equivalent elements. In addition, a detailed description of well-known features or functions will be omitted in order not to unnecessarily obscure the gist of the present disclosure.

In describing the components of the embodiments according to the present disclosure, terms such as first, second, "A", "B", (a), (b), and the like may be used. These terms are merely intended to distinguish one component from another component, and the terms do not limit the nature, sequence or order of the constituent components. Furthermore, unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

Figure 1:
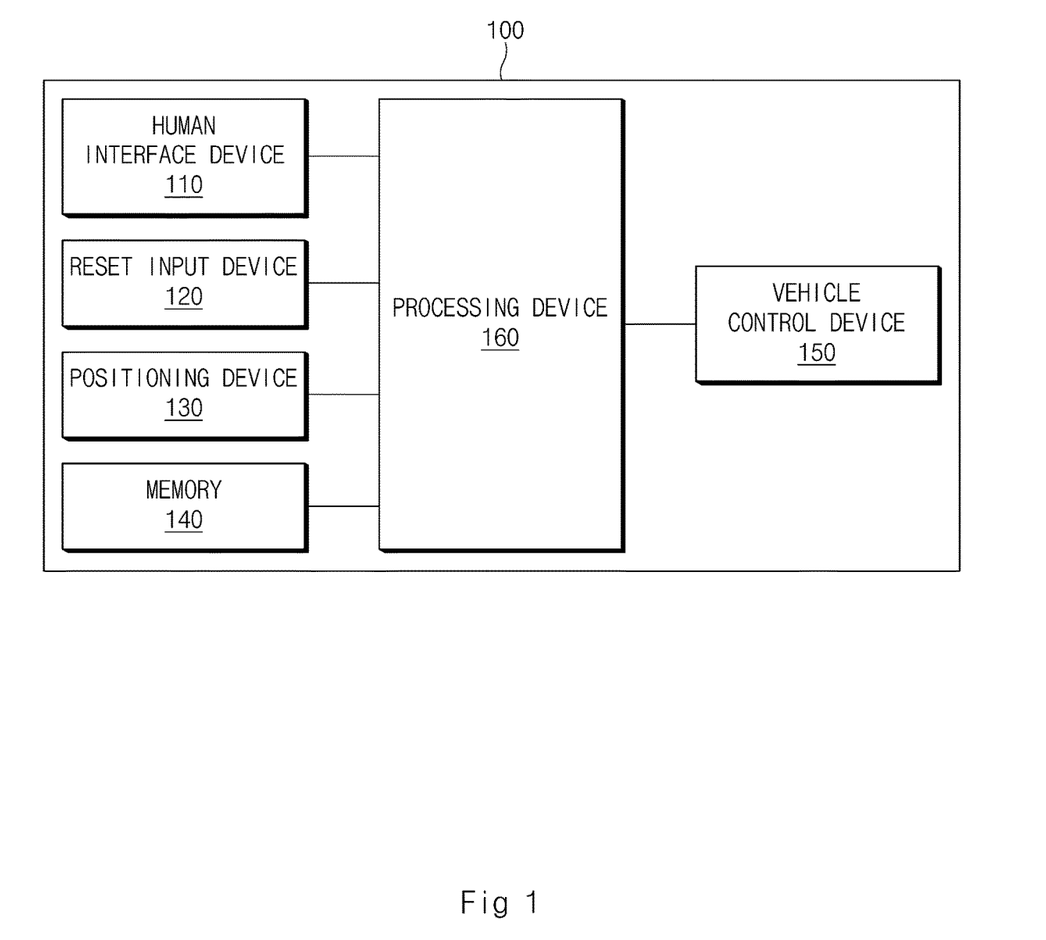
FIG. 1 is a block diagram illustrating a configuration of a vehicle power management apparatus according to embodiments of the present disclosure.

FIG. 1 is a block diagram illustrating a configuration of a vehicle power management apparatus according to embodiments of the present disclosure.

A vehicle power management apparatus 100 may be mounted on a vehicle to manage power consumption of the vehicle depending on a power management mode. The power management mode may be divided into a normal mode and a camping mode. The normal mode may refer to a state where the vehicle is not used for camping, and the camping mode may refer to a state where the vehicle is used for camping. Such a vehicle power management apparatus 100 may be implemented as a vehicle terminal such as audio video navigation (AVN).

The vehicle power management apparatus 100 may include a human interface device (HID) 110, a reset input device 120, a positioning device 130, a memory 140, a vehicle control device 150, a processing device 160, and the like.

The HID 11*o* may assist the vehicle power management apparatus 100 to interact with a user. The HID 11*o* may include at least one of input and output devices such as a keyboard, a keypad, a button, a switch, a touch pad, a microphone, a touch screen, a display, and/or a speaker. The HID 11*o* may generate data according to manipulation of a user and may output visual information, audible information, and/or the like depending on an instruction of the processing device 160.

The reset input device 120 may transmit a reset command to the processing device 160 depending on manipulation of the user. The reset input device 120 may be provided in the form of a separate switch, button, or the like.

The positioning device 130 may measure a current position of the vehicle (or a vehicle position). The positioning device 130 may be implemented as a global positioning system (GPS) receiver. The GPS receiver may calculate a current position of the vehicle using signals transmitted from three or more GPS satellites. The GPS receiver may calculate a distance between the satellite and the GPS receiver using a time difference between a time when the satellite transmits a signal and a time when the GPS receiver receives the signal. The GPS receiver may calculate a current position of the vehicle using the calculated distance between the satellite and the GPS receiver and position information of the satellite, which is included in the transmitted signal. In this case, the GPS receiver may calculate the current position using triangulation.

The memory 140 may be a non-transitory storage medium which stores software programmed such that the processing device 160 performs a predetermined operation. Furthermore, the memory 140 may store map data. The memory 140 may be implemented as at least one of storage media (recording media) such as a flash memory, a hard disk, a solid state disk (SSD), a random access memory (RAM), a static RAM (SRAM), a read only memory (ROM), a programmable ROM (PROM), an electrically erasable and programmable ROM (EEPROM), and/or an erasable and programmable ROM (EPROM).

The vehicle control device 150 may include at least one electronic control unit (ECU) for controlling a predetermined vehicle function. It is shown that the vehicle control device 150 is loaded into the vehicle power management apparatus 100 in the drawing, but the embodiments are not limited thereto. The vehicle control device 150 may be provided outside the vehicle power management apparatus 100. The vehicle control device 150 may include at least one of a body control module (BCM), an integrated central control unit (ICU), an integrated body control unit (IBU), a power seat module (PSM), a steering column module (SCM), a driver power seat unit (DPSU), an assist power seat unit (APSU), a rear right power seat unit (RRSU), and/or a rear left power seat unit (RLSU).

The processing device 160 may control the overall operation of the vehicle power management apparatus 100. The processing device 160 may be implemented as at least one of processing devices such as an application specific integrated circuit (ASIC), a digital signal processor (DSP), programmable logic devices (PLDs), field programmable gate arrays (FPGAs), a central processing unit (CPU), microcontrollers, and/or microprocessors.

When the power management mode is the normal mode, the processing device 160 may support a vehicle function necessary for a driver and/or a passenger to use the vehicle without limitation. For example, when the power management mode is the normal mode, the processing device 160 may support the vehicle function as follows.

When the ignition (IGN) is turned off, the processing device 160 may turn on an interior switch light of the vehicle and may turn on a head lamp during a certain time.

The processing device 160 may turn on a door scuff lamp and/or an interior room lamp when opening a door and may display a door open warning on a cluster (does not enter a sleep mode for up to 20 minutes).

The processing device 16o may turn on a luggage lamp and/or a trunk room lamp when a tailgate and a trunk are opened and may display a tailgate and trunk open warning on the cluster (does not enter a sleep mode for up to 20 minutes).

When the IGN switches from a turn-on state to a turn-off state, a power window switch operation is possible until the door is opened (does not enter a sleep mode for up to 10 minutes).

The processing device 16o may operate a seat riding and alighting interworking function, when the door is opened and closed.

The processing device 16o may set the power management mode to the camping mode or release the camping mode depending on a user input received from the HID 11o. The processing device 160 may set or release the camping mode based on the user input in a user setting menu.

Furthermore, the processing device 160 may set or release the camping mode depending on a current position of the vehicle based on map data stored in the memory 140. As an example, when the vehicle enters a space designated as a camping place, for example, a campground, a campsite, and/or a recreational forest to be parked, the processing device 160 may output a pop-up window querying whether to set the power management mode to the camping mode. After outputting the pop-up window, the processing device 160 may identify an intention of the user and may determine whether to set the camping mode.

When the vehicle is turned off (i.e., when the IGN is turned off) in the state where the camping mode is set, the processing device 16o may detect a battery state of charge (SOC). The processing device 160 may detect a battery SOC using a battery management system (BMS).

The processing device 16o may identify whether the detected battery SOC is greater than or equal to a predetermined threshold SOC. When the battery SOC is greater than or equal to the threshold SOC, the processing device 16o may enter the camping mode.

When entering the camping mode, the processing device 16o may allow an operation of a first vehicle function and may limit an operation (or execution) of a second vehicle function. The first vehicle function and the second vehicle function may be determined in advance by the user or a system designer. The first vehicle function may be a function needed in the camping mode, which may include a room lamp on and off function, a door unlock function, and/or the like. The second vehicle function may be a vehicle function which is not needed in the camping mode, which may be turned off or stopped in the camping mode.

As an example, when entering the camping mode, the processing device 16o may stop an automatic on and off function of lighting such as a room lamp and a tailgate luggage lamp. In other words, the processing device 16o may instruct (or request) the BCM to turn off an automatic on and off function of the room lamp which is automatically turned on or off as the vehicle door is opened and closed. Furthermore, the processing device 16o may request the ICU to turn off an automatic on and off function of the tailgate luggage lamp which is turned on or off by interworking with an opening and closing operation of the tailgate.

As another example, the processing device 16o may limit the lighting of a warning light of the cluster. The processing device 16o may limit an operation of the ICU not to transmit a door open signal, a tailgate open signal, and/or the like to the cluster. In other words, because the ICU does not transmit the door open signal and/or the tailgate open signal although detecting that the vehicle door is opened and/or that the tailgate is opened, the warning light of the cluster may fail to be turned on.

As another example, to turn off a seat function such as a power sheet, a heat ray sheet, and/or a ventilation sheet, the processing device 160 may compulsorily switch an operation mode of the vehicle control device 150 which performs the seat function, for example, the PSM, the SCM, the DPSU, the RRSU, and/or the RLSU to a sleep mode. In other words, the vehicle control device 150 may enter the sleep mode depending on an instruction of the processing device 160.

As another example, the processing device 160 may limit an automatic function of a power tailgate and/or a power sliding door. In other words, the processing device 160 may turn off an automatic opening and closing function of the power tailgate and/or the power sliding door or may compulsorily enter the sleep mode.

As another example, the processing device 160 may display battery state information on the cluster by means of the ICU. After entering the camping mode, the processing device 160 may monitor a battery SOC. When the battery SOC decreases to a predetermined reference SOC or less while monitoring the battery SOC, the processing device 160 may output a warning. Thereafter, the processing device 160 may output a warning, whenever the battery SOC decreases by a predetermined unit. For example, when the reference SOC is 40% and when a decrease unit is 10%, the processing device 160 may output a warning message on the cluster when the battery SOC arrives at 40% and may then output a warning message on the cluster whenever the battery SOC decreases by 10%. In this case, the processing device 160 may output the warning message on the cluster during a predetermined time (e.g., 30 seconds).

When the battery SOC is less than the threshold SOC, the processing device 160 may enter a power-saving mode. When entering the power-saving mode, the processing device 160 may shut off all power to the vehicle. For example, when entering the power-saving mode, the processing device 160 may turn off the IBU, the ICU, a power trunk function, a mirror function, a seat function, and/or the like and may enter the sleep mode.

When the reset command is received from the reset input device 120, the processing device 160 may release the power-saving mode. The processing device 160 may shut off all power to the vehicle, until the reset command is received.

Figure 2:
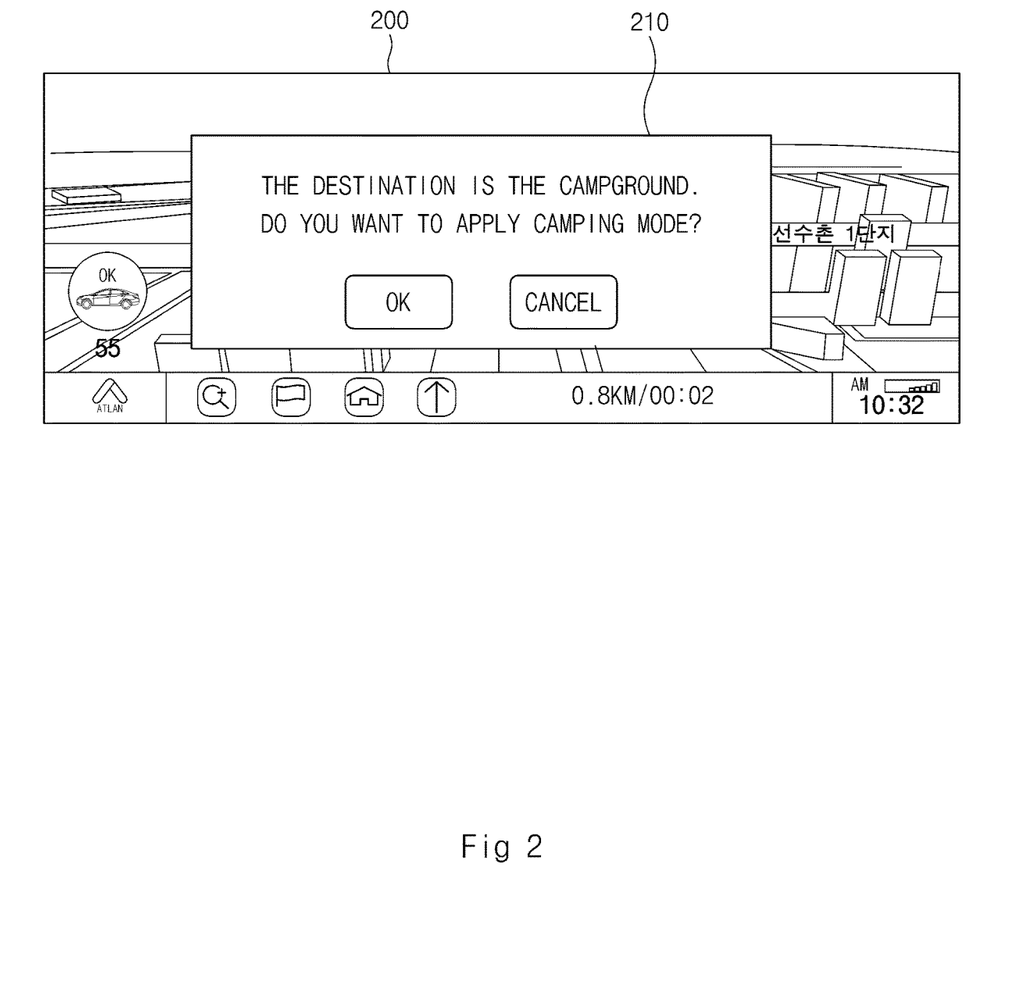
FIG. 2 is a drawing illustrating an example of setting a camping mode according to embodiments of the present disclosure.

FIG. 2 is a drawing illustrating an example of setting a camping mode according to embodiments of the present disclosure.

When the IGN is turned off after a vehicle arrives at a predetermined destination, a processing device 16o of FIG. 1 may identify whether the destination is a camping place (e.g., a campsite, a campground, a recreational forest, and/or the like) based on map data. When the destination is the camping place, the processing device 16o may display a pop-up window 210, which displays a message querying whether to apply a camping mode, together with a guidance message providing a notification that the destination is the camping place, on a display 200. When an "OK" button and a "cancel" button displayed on the pop-up window 210 are selected by a user, the processing device 160 may set a power management mode to a camping mode depending on the selection. In other words, when the "OK" button is selected by the user, the processing device 160 may set the power management mode to the camping mode. Meanwhile, when the "cancel" button is selected by the user, the processing device 160 may fail to set the power management mode to the camping mode.

Figure 3:
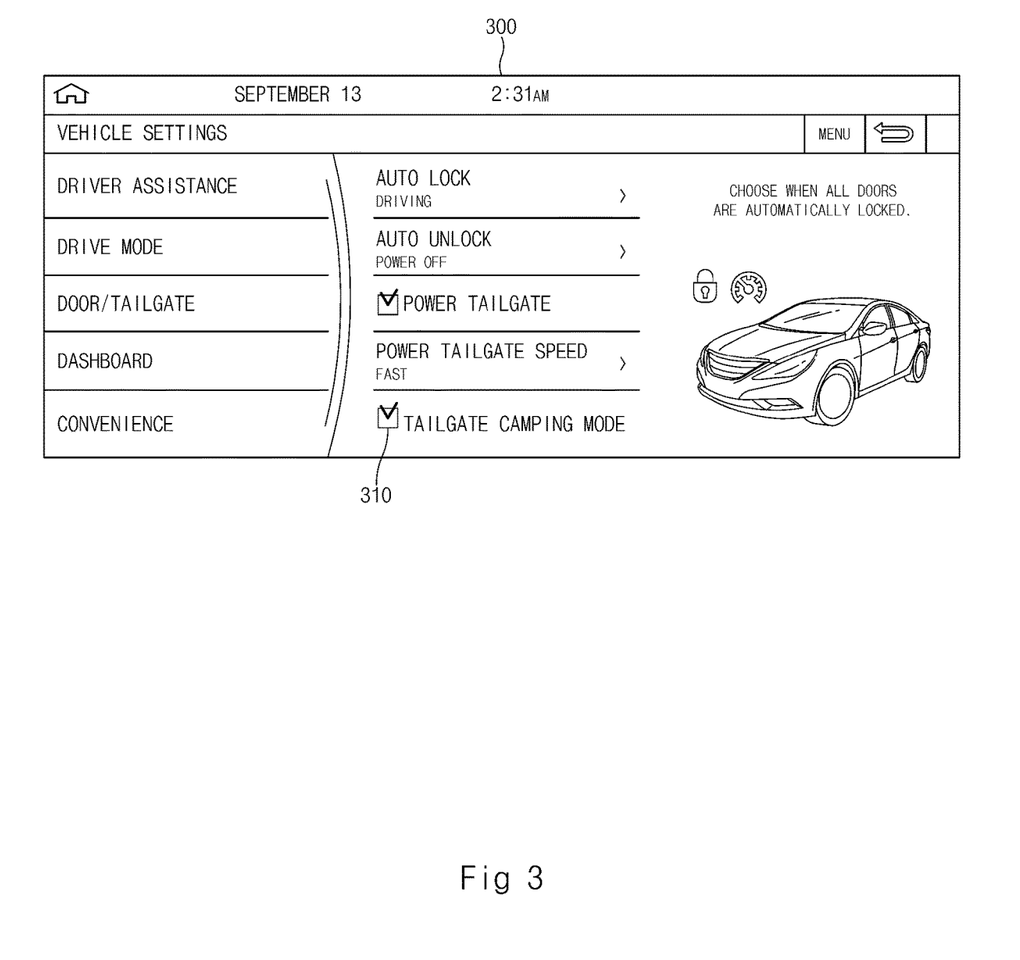
FIG. 3 is a drawing illustrating a configuration screen for describing another example of setting a camping mode according to embodiments of the present disclosure.

FIG. 3 is a drawing illustrating a configuration screen for describing another example of setting a camping mode according to embodiments of the present disclosure.

In the present embodiment, a description will be given of an example of setting whether to apply a camping mode for each vehicle function.

Referring to FIG. 3, a processing device 160 of a vehicle power management apparatus 100 of FIG. 1 may output a user setting menu on a display 300 depending on a user input. The processing device 160 may select a power tailgate item among setting items for a vehicle function such as a door and a tailgate in the user setting menu based on the user input. The processing device 160 may select a combo box 310 corresponding to a tailgate camping mode among sub-items of the selected power tailgate item. When the combo box 310 is selected by a user, the processing device 160 may set the tailgate camping mode. When the combo box 310 is released by the user, the processing device 160 may release the tailgate camping mode. Furthermore, the processing device 160 may set or release a door camping mode in the same method.

Furthermore, when the IGN is turned on, the processing device 160 may release the camping mode. In other words, when the vehicle is turned on (i.e., the ignition is turned on), the processing device 160 may automatically release the camping mode.

Figure 4:
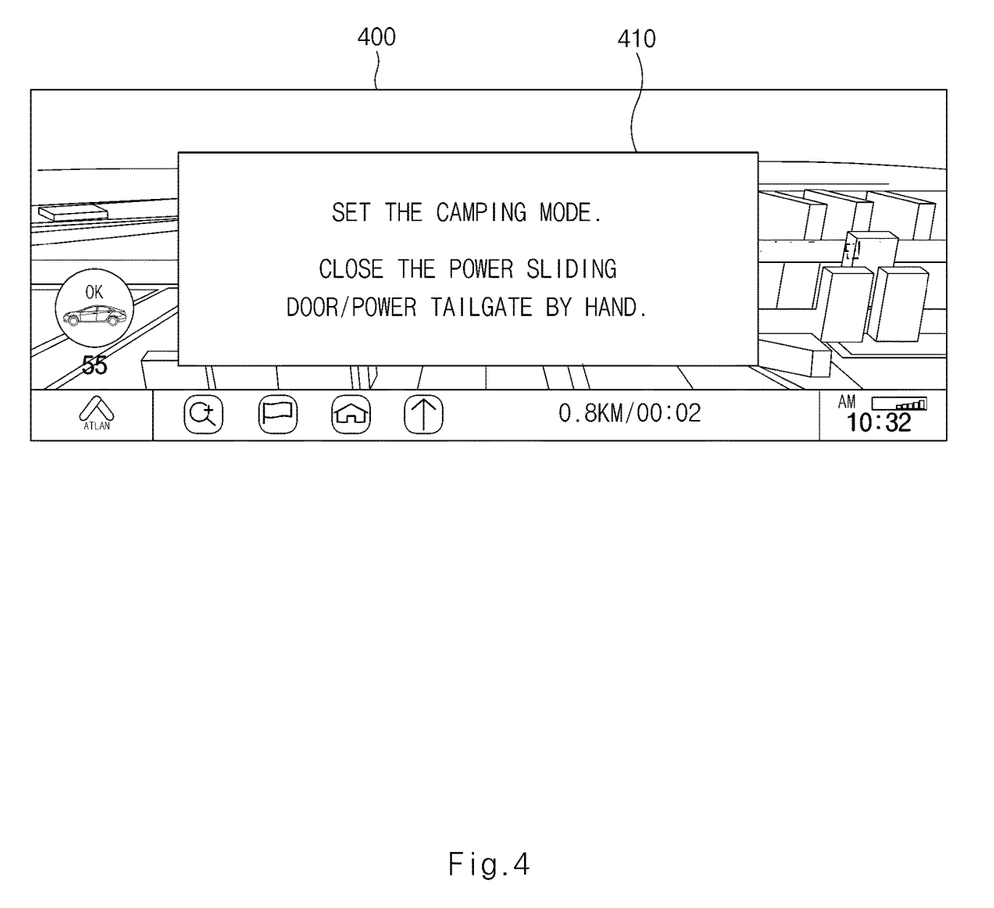
FIG. 4 is a drawing illustrating a guidance output screen when setting a camping mode according to embodiments of the present disclosure.

FIG. 4 is a drawing illustrating a guidance output screen when setting a camping mode according to embodiments of the present disclosure.

Referring to FIG. 4, when a power management mode is set to a camping mode, a processing device 160 of a vehicle power management apparatus 100 of FIG. 1 may display a message indicating the power management mode is set to the camping mode on a display 400 in the form of a pop-up window 410. The processing device 160 may display a message guiding a user to manually manipulate a power sliding door and a power tailgate together with a guidance message providing a notification that the power management mode is set to the camping mode on the pop-up window 410 of the display 400.

Figure 5:
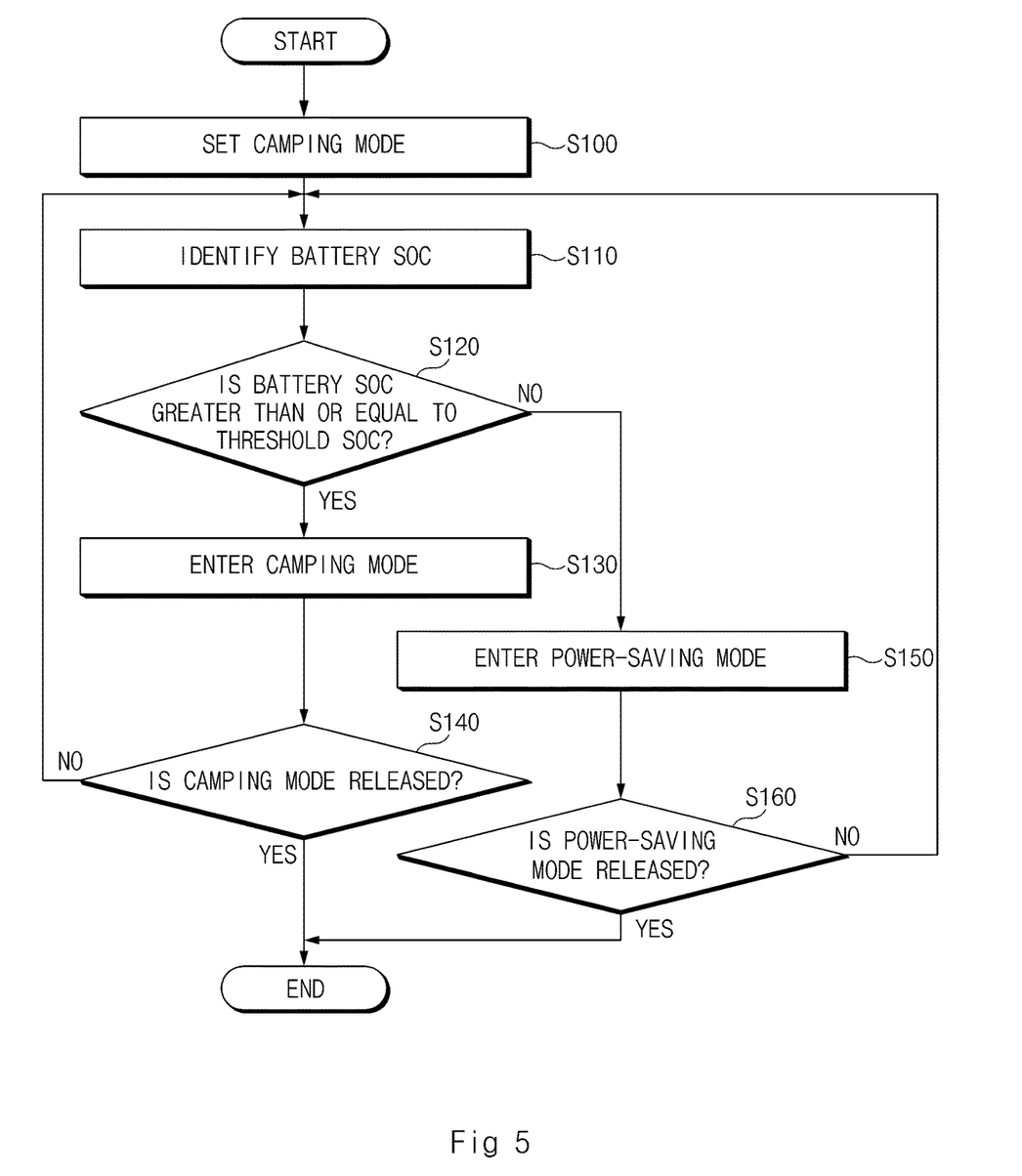
FIG. 5 is a flowchart illustrating a vehicle power management method according to embodiments of the present disclosure.

FIG. 5 is a flowchart illustrating a vehicle power management method according to embodiments of the present disclosure.

Referring to FIG. 5, in S100, a processing device 160 of a vehicle power management apparatus 100 of FIG. 1 may set a power management mode to a camping mode. The processing device 160 may set the power management mode to the camping mode or release the camping mode depending on a user input received from an HID 110 of FIG. 1 in a user setting menu. Furthermore, the processing device 160 may set or release the camping mode depending on a current position of a vehicle based on map data stored in a memory 140 of FIG. 1.

After setting the camping mode, in S110, the processing device 160 may identify a battery SOC. When the IGN is turned off in the state where the camping mode is set, the processing device 160 may detect a battery SOC using a BMS.

In S120, the processing device 160 may identify whether the battery SOC is greater than or equal to a threshold SOC. The processing device 160 may compare the detected battery SOC with the threshold SOC stored in the memory 140.

When the battery SOC is greater than or equal to the threshold SOC, in S130, the processing device 160 may enter the camping mode. When entering the camping mode, the processing device 160 may allow an operation of a first vehicle function and may limit a second vehicle function. For example, the processing device 160 may enable an IBU and/or an ICU for performing a door unlock function and/or a room lamp on and off function and may allow controllers, which perform the second vehicle function, to enter a sleep mode. In this case, the controllers, which perform the second vehicle function, may ignore an input signal.

In S140, the processing device 160 may identify whether the camping mode is released. When a camping mode release command is received from a user or another controller, the processing device 160 may release the camping mode.

When the battery SOC is less than the threshold SOC in S120, in S150, the processing device 160 may enter the power-saving mode. When the battery SOC decreases to below the threshold SOC, for example, 20% or less, the processing device 16o may turn off both the door unlock function of the IBU and the room lamp on and off function of the ICU to enter the sleep mode.

In S16o, the processing device 16o may identify whether the power-saving mode is released. The processing device 16o may shut off all power to the vehicle, until the reset command is received from a reset input device 120 of FIG. 1.

According to various embodiments of the present disclosure, the vehicle power management apparatus may prevent battery discharging by limiting an operation of a vehicle function upon car camping to minimize power consumption of the vehicle.

Furthermore, according to various embodiments of the present disclosure, the vehicle power management apparatus may minimize power consumption of the vehicle by being applied upon long-term parking.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims. Therefore, embodiments of the present invention are not intended to limit the technical spirit of the present invention, but are provided only for illustrative purpose. The scope of the present disclosure should be construed on the basis of the accompanying claims, and all the technical ideas within the scope equivalent to the claims should be included in the scope of the present disclosure.

What is claimed is:
1. A vehicle power management apparatus comprising:
a memory storing a threshold state of charge (SOC); and
a processing device functionally connected to the memory,
wherein the processing device is configured to:
set a power management mode in the vehicle power management apparatus to a camping mode, wherein the camping mode is a state of the power management mode where a vehicle is used for camping,
identify a battery SOC of the vehicle in response to an ignition of the vehicle being turned off in a state where the camping mode is set,
identify whether the battery SOC is greater than or equal to the threshold SOC, and
enter the camping mode to allow an operation of a first vehicle function and limit an operation of a second vehicle function in response to the battery SOC being greater than or equal to the threshold SOC,
wherein the processing device is configured to automatically release the camping mode in response to the ignition being turned on from being turned off in a state in which the processing device identifies the battery SOC.

2. The vehicle power management apparatus of claim 1, wherein the processing device is configured to set the power management mode to the camping mode in response to the vehicle entering a camping place to be parked as identified based on map data.

3. The vehicle power management apparatus of claim 1, wherein the processing device is configured to set the power management mode to the camping mode based on a user input received from a user interface in a user setting menu.

4. The vehicle power management apparatus of claim 1, wherein the first vehicle function includes a room lamp on and off function or a door unlock function.

5. The vehicle power management apparatus of claim 1, wherein the processing device is configured to monitor the battery SOC after entering the camping mode and output a warning in response to the battery SOC decreasing to a predetermined reference SOC or less.

6. The vehicle power management apparatus of claim 1, wherein the processing device is configured to switch the power management mode to a power-saving mode in response to the battery SOC being less than the threshold SOC.

7. The vehicle power management apparatus of claim 6, wherein the processing device is configured to enter the power-saving mode to limit an operation of the first vehicle function and the second vehicle function sw.

8. The vehicle power management apparatus of claim 6, wherein the processing device is configured to release the power-saving mode in response to receiving a reset command from a reset input device.

9. The vehicle power management apparatus of claim 1, wherein the second vehicle function comprises lighting of a warning light of a cluster, a seat function, an automatic opening and closing function of a power tailgate, an automatic opening and closing function of a power sliding door, an automatic on and off function of a room lamp as a vehicle door is opened and closed, or an automatic on and off function of a tailgate luggage lamp as a tailgate is opened and closed.

10. A vehicle power management method comprising:
setting a power management mode in a power management apparatus to a camping mode, wherein the camping mode is a state of the power management mode where a vehicle is used for camping;
identifying, by a processing device, a battery state of charge (SOC) of the vehicle in response to an ignition of the vehicle being turned off in a state where the camping mode is set;
identifying whether the battery SOC is greater than or equal to a predetermined threshold SOC;
entering the camping mode to allow an operation of a first vehicle function and limit an operation of a second vehicle function in response to identifying that the battery SOC is greater than or equal to the predetermined threshold SOC; and
automatically releasing the camping mode in response to the ignition being turned on from being turned off in a state where the processing device identifies the battery SOC.

11. The vehicle power management method of claim 10, wherein setting the power management mode to the camping mode comprises setting the power management mode to the camping mode in response to the vehicle entering a camping place to be parked as identified based on map data.

12. The vehicle power management method of claim 10, wherein setting the power management mode to the camping mode comprises setting the power management mode to the camping mode based on a user input received from a user interface in a user setting menu.

13. The vehicle power management method of claim 10, wherein the first vehicle function includes a room lamp on and off function or a door unlock function.

14. The vehicle power management method of claim 10, further comprising:
monitoring the battery SOC after entering the camping mode; and
outputting a warning in response to the battery SOC decreasing to a predetermined reference SOC or less.

15. The vehicle power management method of claim 10, further comprising switching the power management mode to a power-saving mode in response to identifying that the battery SOC is less than the predetermined threshold SOC.

16. The vehicle power management method of claim 15, wherein switching the power management mode to the power-saving mode comprises entering the power-saving mode to limit an operation of the first vehicle function and the second vehicle function.

17. The vehicle power management method of claim 15, further comprising releasing the power-saving mode in response to receiving a reset command from a reset input device.

18. The vehicle power management method of claim 10, wherein the second vehicle function comprises lighting of a warning light of a cluster, a seat function, an automatic opening and closing function of a power tailgate, an automatic opening and closing function of a power sliding door, an automatic on and off function of a room lamp as a vehicle door is opened and closed, or an automatic on and off function of a tailgate luggage lamp as a tailgate is opened and closed.

* * * * *

UNITED STATES PATENT AND TRADEMARK OFFICE
CERTIFICATE OF CORRECTION

| | |
|---|---|
| PATENT NO. | : 12,139,083 B2 |
| APPLICATION NO. | : 17/702398 |
| DATED | : November 12, 2024 |
| INVENTOR(S) | : Jong Gyun Shin |

Page 1 of 1

It is certified that error appears in the above-identified patent and that said Letters Patent is hereby corrected as shown below:

In the Claims

In Column 9, in Claim 7, Line 32, after "vehicle function" delete "sw".

Signed and Sealed this
Twenty-fourth Day of December, 2024

Derrick Brent
*Acting Director of the United States Patent and Trademark Office*